US007213646B2

(12) United States Patent  
Roddy et al.

(10) Patent No.: US 7,213,646 B2
(45) Date of Patent: May 8, 2007

(54) CEMENTING COMPOSITIONS COMPRISING CEMENT KILN DUST, VITRIFIED SHALE, ZEOLITE, AND/OR AMORPHOUS SILICA UTILIZING A PACKING VOLUME FRACTION, AND ASSOCIATED METHODS

(75) Inventors: Craig W. Roddy, Duncan, OK (US); Ricky L. Covington, Duncan, OK (US); Jiten Chatterji, Duncan, OK (US)

(73) Assignee: Halliburton Energy Services, Inc.

( * ) Notice: Subject to any disclaimer, the term of this patent is extended or adjusted under 35 U.S.C. 154(b) by 0 days.

(21) Appl. No.: 11/484,951

(22) Filed: Jul. 12, 2006

(65) Prior Publication Data

US 2007/0056732 A1    Mar. 15, 2007

Related U.S. Application Data

(63) Continuation-in-part of application No. 11/223,671, filed on Sep. 9, 2005, now Pat. No. 7,077,203.

(51) Int. Cl.
E21B 33/13 (2006.01)
E21B 33/14 (2006.01)

(52) U.S. Cl. .................. 166/285; 166/292; 106/751; 106/811; 106/813; 106/816; 106/819

(58) Field of Classification Search .................. None
See application file for complete search history.

(56) References Cited

U.S. PATENT DOCUMENTS

| 2,094,316 | A | 9/1937 | Cross et al. |
| 2,329,940 | A | 9/1943 | Ponzer |
| 2,842,205 | A | 7/1958 | Allen et al. |
| 2,871,133 | A | 1/1959 | Palonen et al. |
| 2,945,769 | A | 7/1960 | Gama et al. |
| 3,454,095 | A | 7/1969 | Messenger et al. |
| 3,748,159 | A | 7/1973 | George |
| 3,887,385 | A | 6/1975 | Quist et al. |
| 4,018,617 | A | 4/1977 | Nicholson |
| 4,031,184 | A | 6/1977 | McCord |
| 4,268,316 | A | 5/1981 | Wills, Jr. |
| 4,341,562 | A | 7/1982 | Ahlbeck |
| RE31,190 | E | 3/1983 | Detroit et al. |
| 4,407,677 | A | 10/1983 | Wills, Jr. |
| 4,432,800 | A | 2/1984 | Kneller et al. |
| 4,435,216 | A | 3/1984 | Diehl et al. |
| 4,460,292 | A | 7/1984 | Durham |
| 4,515,635 | A | 5/1985 | Rao et al. |
| 4,555,269 | A | 11/1985 | Rao et al. |
| 4,614,599 | A | 9/1986 | Walker |
| 4,676,317 | A | 6/1987 | Fry et al. |
| 4,741,782 | A | 5/1988 | Styron |
| 4,784,223 | A | 11/1988 | Worrall et al. |
| 4,941,536 | A | 7/1990 | Brothers et al. |
| 4,992,102 | A | 2/1991 | Barbour et al. |
| 5,049,288 | A | 9/1991 | Brothers et al. |
| RE33,747 | E | 11/1991 | Hartley et al. |
| RE33,767 | E | 12/1991 | Christini et al. |
| 5,086,850 | A | 2/1992 | Harris et al. |
| 5,121,795 | A | 6/1992 | Ewert et al. |
| 5,123,487 | A | * | 6/1992 | Harris et al. ................ 166/277 |
| 5,125,455 | A | 6/1992 | Harris et al. |
| 5,127,473 | A | * | 7/1992 | Harris et al. ................ 166/277 |
| 5,238,064 | A | 8/1993 | Dahl et al. |
| 5,266,111 | A | 11/1993 | Barbour et al. |
| 5,295,543 | A | 3/1994 | Terry et al. |
| 5,314,022 | A | 5/1994 | Cowan et al. |
| 5,327,968 | A | 7/1994 | Onan et al. |
| 5,337,824 | A | 8/1994 | Cowan |
| 5,358,044 | A | 10/1994 | Hale et al. |
| 5,368,103 | A | 11/1994 | Heathman et al. |
| 5,383,521 | A | 1/1995 | Onan et al. |
| 5,383,967 | A | 1/1995 | Chase |
| 5,458,195 | A | 10/1995 | Totten et al. |
| 5,472,051 | A | 12/1995 | Brothers |
| 5,494,513 | A | 2/1996 | Fu et al. |
| 5,518,996 | A | 5/1996 | Maroy et al. |
| 5,520,730 | A | 5/1996 | Barbour |
| 5,529,624 | A | 6/1996 | Riegler |

(Continued)

FOREIGN PATENT DOCUMENTS

| CA | 2153372 | 9/1996 |
| GB | 1469954 | 4/1977 |
| JP | 52117316 A | 1/1977 |
| JP | 10110487 | 4/1998 |
| SU | 1373781 | 2/1988 |
| WO | WO 83/01443 | 4/1983 |
| WO | WO 98/54108 | 12/1998 |
| WO | WO 00/63134 | 10/2000 |
| WO | WO 03/031364 A1 | 4/2003 |

OTHER PUBLICATIONS

Halliburton brochure entitled "Halad®-23 Fluid-Loss Additive" dated 2000.
Halliburton brochure entitled "Halad®-344 Fluid Loss Additive" dated 1998.
Halliburton brochure entitled "Halad®-413 Fluid-Loss Additive" dated 1998.
Halliburton brochure entitled "HR®-4 Cement Retarder" dated 1999.

(Continued)

Primary Examiner—George Suchfield
(74) Attorney, Agent, or Firm—Craig W. Roddy; Fletcher Yoder

(57) ABSTRACT

Cementing compositions are provided that comprise water, cement kiln dust, vitrified shale, zeolite, and/or amorphous silica, that utilize a packing volume fraction such that the solid particulate materials of the fluid are in a hindered settling state. Methods of cementing are provided that utilize compositions comprising water, cement kiln dust, vitrified shale, zeolite, and/or amorphous silica, that utilize a packing volume fraction such that the solid particulate materials of the fluid are in a hindered settling state.

33 Claims, No Drawings

U.S. PATENT DOCUMENTS

| | | |
|---|---|---|
| 5,536,311 A | 7/1996 | Rodrigues |
| 5,569,324 A | 10/1996 | Totten et al. |
| 5,585,333 A | 12/1996 | Dahl et al. |
| 5,588,489 A | 12/1996 | Chatterji et al. |
| 5,711,383 A | 1/1998 | Terry et al. |
| 5,716,910 A | 2/1998 | Totten et al. |
| 5,728,654 A | 3/1998 | Dobson, Jr. |
| 5,851,960 A | 12/1998 | Totten et al. |
| 5,874,387 A | 2/1999 | Carpenter et al. |
| 5,897,699 A | 4/1999 | Chatterji et al. |
| 5,900,053 A | 5/1999 | Brothers et al. |
| 5,913,364 A | 6/1999 | Sweatman |
| 5,988,279 A | 11/1999 | Udarbe et al. |
| 6,022,408 A * | 2/2000 | Stokes et al. ............... 106/739 |
| 6,060,434 A | 5/2000 | Sweatman et al. |
| 6,060,535 A | 5/2000 | Villar et al. |
| 6,063,738 A | 5/2000 | Chatterji et al. |
| 6,138,759 A | 10/2000 | Chatterji et al. |
| 6,143,069 A | 11/2000 | Brothers et al. |
| 6,145,591 A | 11/2000 | Boncan et al. |
| 6,153,562 A | 11/2000 | Villar et al. |
| 6,167,967 B1 | 1/2001 | Sweatman |
| 6,170,575 B1 | 1/2001 | Reddy et al. |
| 6,230,804 B1 | 5/2001 | Mueller et al. |
| 6,244,343 B1 | 6/2001 | Brothers et al. |
| 6,245,142 B1 | 6/2001 | Reddy et al. |
| 6,258,757 B1 | 7/2001 | Sweatman et al. |
| 6,277,189 B1 | 8/2001 | Chugh ........................ 106/705 |
| 6,312,515 B1 | 11/2001 | Barlet-Gouedard et al. |
| 6,315,042 B1 | 11/2001 | Griffith et al. |
| 6,332,921 B1 | 12/2001 | Brothers et al. |
| 6,367,550 B1 | 4/2002 | Chatterji et al. |
| 6,379,456 B1 | 4/2002 | Heathman et al. |
| 6,457,524 B1 | 10/2002 | Roddy |
| 6,478,869 B2 | 11/2002 | Reddy et al. |
| 6,488,763 B2 | 12/2002 | Brothers et al. |
| 6,494,951 B1 | 12/2002 | Reddy et al. |
| 6,508,305 B1 | 1/2003 | Brannon et al. |
| 6,524,384 B2 | 2/2003 | Griffith et al. |
| 6,547,871 B2 | 4/2003 | Chatterji et al. |
| 6,561,273 B2 | 5/2003 | Brothers et al. |
| 6,562,122 B2 | 5/2003 | Dao et al. |
| 6,565,647 B1 | 5/2003 | Day et al. |
| 6,610,139 B2 | 8/2003 | Reddy et al. |
| 6,626,243 B1 | 9/2003 | Boncan |
| 6,645,290 B1 | 11/2003 | Barbour |
| 6,656,265 B1 | 12/2003 | Garnier et al. |
| 6,660,080 B2 | 12/2003 | Reddy et al. |
| 6,666,268 B2 | 12/2003 | Griffith et al. |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,716,282 B2 | 4/2004 | Griffith et al. |
| 6,729,405 B2 | 5/2004 | DiLullo et al. |
| 6,767,398 B2 | 7/2004 | Trato |
| 6,776,237 B2 | 8/2004 | Dao et al. |
| 6,796,378 B2 | 9/2004 | Reddy et al. |
| 6,797,054 B2 | 9/2004 | Chatterji et al. |
| 6,823,940 B2 | 11/2004 | Reddy et al. |
| 6,835,243 B2 | 12/2004 | Brothers et al. |
| 6,837,316 B2 | 1/2005 | Reddy et al. |
| 6,846,357 B2 | 1/2005 | Reddy et al. |
| 6,848,519 B2 | 2/2005 | Reddy et al. |
| 6,887,833 B2 | 5/2005 | Brothers et al. |
| 6,889,767 B2 | 5/2005 | Reddy et al. |
| 6,904,971 B2 | 6/2005 | Brothers et al. |
| 6,908,508 B2 | 6/2005 | Brothers |
| 6,911,078 B2 | 6/2005 | Barlet-Gouedard et al. |
| 7,077,203 B1 | 7/2006 | Roddy et al. |
| 2002/0033121 A1 | 3/2002 | Marko |
| 2002/0073897 A1 | 6/2002 | Trato ........................ 106/638 |
| 2002/0117090 A1 | 8/2002 | Ku |
| 2003/0116887 A1 | 6/2003 | Scott |
| 2003/0167970 A1 | 9/2003 | Polston |
| 2004/0007162 A1 | 1/2004 | Morioka et al. |
| 2004/0040475 A1 | 3/2004 | Roij |
| 2004/0079260 A1 | 4/2004 | Datta et al. |
| 2004/0107877 A1 | 6/2004 | Getzlaf et al. |
| 2004/0108113 A1 | 6/2004 | Luke et al. |
| 2004/0112600 A1 | 6/2004 | Luke et al. |
| 2004/0187740 A1 | 9/2004 | Timmons |
| 2004/0188091 A1 | 9/2004 | Luke et al. |
| 2004/0188092 A1 | 9/2004 | Santra et al. |
| 2004/0191439 A1 | 9/2004 | Bour et al. |
| 2004/0211562 A1 | 10/2004 | Brothers et al. |
| 2004/0211564 A1 | 10/2004 | Brothers et al. |
| 2004/0244650 A1 | 12/2004 | Brothers |
| 2004/0244977 A1 | 12/2004 | Luke et al. |
| 2004/0256102 A1 | 12/2004 | Trato |
| 2005/0000734 A1 | 1/2005 | Getzlaf et al. |
| 2005/0034867 A1 | 2/2005 | Griffith et al. |
| 2005/0056191 A1 | 3/2005 | Brothers et al. |
| 2005/0072599 A1 | 4/2005 | Luke et al. |
| 2006/0025312 A1 | 2/2006 | Santra et al. |
| 2006/0162926 A1 | 7/2006 | Roddy ........................ 166/278 |
| 2006/0166834 A1 | 7/2006 | Roddy ........................ 507/140 |

OTHER PUBLICATIONS

Halliburton brochure entitled "HR®-5 Cement Additive" dated 1998.
Halliburton brochure entitled "HR®-7 Cement Retarder" dated 1999.
Halliburton brochure entitled HR®-12 Cement Retarder dated 1999.
Halliburton brochure entitled HR®-15 Cement Retarder dated 1999.
Halliburton brochure entitled "HR®-25 Cement Retarder" dated 1999.
Halliburton brochure entitled "SCR-100 Cement Retarder" dated 1999.
Halliburton brochure entitled "SCR-100 Cement Retarder—A Valuable Time Saver" dated 1994.
Halliburton brochure entitled "SCR-500L™ High-Temperature Retarder" dated 2000.
Halliburton brochure entitled "AQF-2 Foaming Agent" dated 1999.
Halliburton brochure entitled "Howco-Suds Surfactant" dated 1999.
Halliburton brochure entitled "Pozmix® A Cement Additive" dated 1999.
Halliburton brochure entitled "Pozmix Cement & Pozmix 140" undated.
University of Maine, "Beneficial Use of Solid Waste in Maine" printed from the internet Apr. 14, 2005.
Smith, Dwight K., "Cementing" dated 1980, p. 38.
Parsons, R.L. et al., "Use of Cement Kiln Dust for the Stabilization of Soils" printed from the internet on Apr. 14, 2005.
Paper entitled "Kiln Dusts" printed from the internet on Apr. 14, 2005.
Paper entitled "Standards for the Management of Cement Kiln Dust Waste" printed from the internet Apr. 14, 2005.
Sersale, R. et al., "Portland-Zeolite-Cement For Minimizing Alkali-Aggregate Expansion" dated 1987.
Marfil, S.A. et al., "Zeolite Crystallization in Portland Cement Concrete Due to Alkali-Aggregate Reaction" dated 1993.
Janotka, I., "The Properties of Mortar Using Blends With Portland Cement Clinker, Zeolite Tuff and Gypsum" dated 1995.
Atkins, M. et al., "Zeolite P In Cements" Its Potential For Immobilizing Toxic and Radioactive Waste Species dated 1995.
Rogers, B.A. et al., "Designing a Remedial Acid Treatment for Gulf of Mexico Deepwater Turbidite Sands Containing Zeolite Cement" dated 1998.
Janotka, I. et al., "Effect of Bentonite and Zeolite on Durability of Cement Suspension under Sulfate Attack" dated 1998.

Naiqian, Feng et al., "Study on the suppression effect of natural zeolite on expansion of concrete due to alkali-aggregate reaction" dated 1998.

Chan, Sammy et al., "Comparative study of the initial surface absorption and chloride diffusion of high performance zeolite, silicia fume and PFA concretes" dated 1999.

Ding, Jian-Tong et al., "Extreme vertices design of concrete with combined mineral admixtures" dated 1999.

Poon, C.S. et al., "A study on the hydration of natural zeolite blended cement pastes" dated 1999.

Feng, N.-Q et al., "Zeolite ceramiste cellular concrete" dated 2000.

Bartlet-Gouedard, V. et al., "A Non-Conventional Way of Developing Cement Slurry for Geothermal Wells" dated 2001.

Smith, Dwight "Cementing" Society of Petroleum Engineers, pp. 14, 38.

Office action from U.S. Appl. No. 11/223,671 dated Dec. 15, 2005.

Office action from U.S. Appl. No. 11/271,431 dated Mar. 6, 2006.

Roddy, C. et al., "Methods of Using Settable Compositions Comprising Cement Kiln Dust" U.S. Appl. No. 11/223,671, filed Sep. 9, 2005.

Roddy, C. et al., "Methods of Using Foamed Settable Compositions Comprising Cement Kiln Dust" U.S. Appl. No. 11/223,485, filed Sep. 9, 2005.

Roddy, C. et al., "Foamed Settable Compositions Comprising Cement Kiln Dust," U.S. Appl. No. 11/223,703, filed Sep. 9, 2005.

Roddy, C. et al., "Methods of Using Settable Compositions Comprising Cement Kiln Dust and Additive(s)" U.S. Appl. No. 11/223,750, filed Sep. 9, 2005.

Roddy, C. et al., "Settable Compositions Comprising Cement Kiln Dust and Additive(s)" U.S. Appl. No. 11/223,669, filed Sep. 9, 2005.

Roddy, C. et al., "Methods of Using Cement Compositions Comprising High Alumina Cement and Cement Kiln Dust" U.S. Appl. No. 11/257,261, filed Oct. 24, 2005.

Roddy, C. et al., "Cement Compositions Comprising High Alumina Cement and Cement Kiln Dust" U.S. Appl. No. 11/256,824, filed Oct. 24, 2005.

Roddy, C. et al., "Methods of Using Settable Compositions Comprising Cement Kiln Dust" U.S. Appl. No. 11/271,690, filed Nov. 10, 2005.

Roddy, C. et al., "Settable Spotting Compositions Comprising Cement Kiln Dust" U.S. Appl. No. 11/271,431, filed Nov. 10, 2005.

Office action from U.S. Appl. No. 11/223,671 dated Mar. 31, 2006.

3M Scotchlite™ Glass Bubbles Floated Product Series Product Information brochure dated 1999.

Office action from U.S. Appl. No. 11/271,431 dated May 17, 2006.

Roddy, C. et al., "Methods of Using Lightweight Settable Compositions Comprising Cement Kiln Dust" U.S. Appl. No. 11/416,563, filed May 3, 2006.

Roddy, C. et al., "Lightweight Settable Compositions Comprising Cement Kiln Dust" U.S. Appl. No. 11/416,754, filed May 3, 2006.

Roddy, C. et al., "Methods of Using Settable Drilling Fluids Comprising Cement Kiln Dust" U.S. Appl. No. 11/403,032, filed Apr. 11, 2006.

Roddy, C. et al., "Settable Drilling Fluids Comprising Cement Kiln Dust" U.S. Appl. No. 11/402,741, filed Apr. 11, 2006.

Herndon, J. et al., "Setting Downhole Plugs: A State-of-the-Art," Petroleum Engineer International, Apr. 1978.

Roddy, C. et al., "Methods of Using Settable Compositions Comprising Cement Kiln Dust" U.S. Appl. No. 11/440,627, filed May 25, 2006.

txi® Material Safety Data Sheet for "PRESSUR-SEAL".

LAFARGE North America Material Safety Data Sheet entitled "Cement Kiln Dust" dated Mar. 3, 2005.

LAFARGE brochure entitled "TerraCem™" dated Aug. 2006.

LAFARGE North America Material Safety Data Sheet entitled LaFarge Blended Cement (cement) dated Mar. 3, 2005.

Foreign communication from a related counterpart application dated Nov. 2, 2006.

Office action dated Jul. 11, 2006 from U.S. Appl. No. 11/271,431.

Office action dated Jul. 21, 2006 from U.S. Appl. No. 11/416,563.

Office action dated Jul. 24, 2006 from U.S. Appl. No. 11/403,032.

Office action dated Aug. 15, 2006 from U.S. Appl. No. 11/271,431.

Office action dated Aug. 21, 2006 from U.S. Appl. No. 11/440,627.

Office action dated Oct. 19, 2006 from U.S. Appl. No. 11/402,741.

Foreign communication from a related counterpart application dated Oct. 27, 2006.

Office action dated Feb. 2, 2007 from U.S. Appl. No. 11/402,741.

* cited by examiner

CEMENTING COMPOSITIONS COMPRISING CEMENT KILN DUST, VITRIFIED SHALE, ZEOLITE, AND/OR AMORPHOUS SILICA UTILIZING A PACKING VOLUME FRACTION, AND ASSOCIATED METHODS

CROSS REFERENCE TO RELATED APPLICATIONS

The present application is a continuation-in-part of U.S. patent application Ser. No. 11/223,671, filed on Sep. 9, 2005, now U.S. Pat. No. 7,077,203 titled "Methods of Using Settable Compositions Comprising Cement Kiln Dust," the disclosure of which is incorporated herein by reference in its entirety.

BACKGROUND

The present invention relates to cementing operations and, more particularly, to the use of cementing compositions comprising water, cement kiln dust ("CKD"), vitrified shale, zeolite, and/or amorphous silica, that are prepared by utilizing a packing volume fraction, and associated methods of use.

Cementing compositions are commonly utilized in a variety of subterranean operations. Subterranean applications that may involve cementing compositions include, but are not limited to, primary cementing, remedial cementing, and drilling operations. For example, cement compositions are used in primary cementing operations whereby pipe strings such as casings and liners are cemented in well bores. In performing primary cementing, cement compositions are pumped into the annular space between the walls of a well bore and the exterior surface of the pipe string disposed therein. The cement composition is permitted to set in the annular space, thereby forming an annular sheath of hardened substantially impermeable cement therein that substantially supports and positions the pipe string in the well bore and bonds the exterior surface of the pipe string to the walls of the well bore. Cement compositions are also used in plugging and abandonment operations as well as in remedial cementing operations such as plugging permeable zones or fractures in well bores, plugging cracks and holes in pipe strings, and the like. Cementing compositions also may be used in surface applications, for example, construction cementing.

Cementing compositions used heretofore commonly comprise Portland cement. Portland cement generally is a major component of the cost for the cementing compositions. To reduce the cost of such cementing compositions, other solid particulate components may be included in the cementing composition in addition to, or in place of, the Portland cement. The resulting combination of multiple solid particulate materials in the cementing compositions can result in a "settling effect," in which different sized particulate materials will settle separately at different speeds. This settling of the solids in a cement composition may result in defective cementing procedures and failure of the set cement to provide zonal isolation. Thus, among other things, there are needs for an improved cementing composition for well cements which can be utilized without resulting in settling of solid particulates.

SUMMARY

The present invention relates to cementing operations and, more particularly, to cementing compositions comprising water, CKD, vitrified shale, zeolite, and/or amorphous silica, that are prepared by utilizing a packing volume fraction, and associated methods of use.

In one embodiment, the present invention provides a composition comprising water; and at least three particulate materials chosen from the group consisting of: (a) cement kiln dust, vitrified shale, zeolite, or amorphous silica having a particle size in the range of from about 7 nanometers to about 50 nanometers; (b) cement kiln dust, vitrified shale, zeolite, or amorphous silica having a particle size in the range of from about 0.05 microns to about 0.5 microns; (c) cement kiln dust, vitrified shale, zeolite, or amorphous silica having a particle size in the range of from about 0.5 microns to about 10 microns; (d) cement kiln dust, vitrified shale, zeolite, or amorphous silica having a particle size in the range of from about 10 microns to about 20 microns; (e) cement kiln dust, vitrified shale, zeolite, or amorphous silica having a particle size in the range of from about 20 microns to about 200 microns; (f) cement kiln dust, vitrified shale, zeolite, or amorphous silica having a particle size in the range of from about 200 microns to about 800 microns; and (g) cement kiln dust, vitrified shale, zeolite, or amorphous silica having a particle size greater than about 1 millimeter, wherein a solids volume total of the at least three particulate materials comprises a maximum packing volume fraction.

In one embodiment, the present invention provides a method comprising providing an unhydrated mixture of at least three particulate materials chosen from the group consisting of: (a) cement kiln dust, vitrified shale, zeolite, or amorphous silica having a particle size in the range of from about 7 nanometers to about 50 nanometers; (b) cement kiln dust, vitrified shale, zeolite, or amorphous silica having a particle size in the range of from about 0.05 microns to about 0.5 microns; (c) cement kiln dust, vitrified shale, zeolite, or amorphous silica having a particle size in the range of from about 0.5 microns to about 10 microns; (d) cement kiln dust, vitrified shale, zeolite, or amorphous silica having a particle size in the range of from about 10 microns to about 20 microns; (e) cement kiln dust, vitrified shale, zeolite, or amorphous silica having a particle size in the range of from about 20 microns to about 200 microns; (f) cement kiln dust, vitrified shale, zeolite, or amorphous silica having a particle size in the range of from about 200 microns to about 800 microns; and (g) cement kiln dust, vitrified shale, zeolite, or amorphous silica having a particle size greater than about 1 millimeter, wherein a solids volume total of the at least three particulate materials comprises a maximum packing volume fraction; and adding water to the unhydrated mixture to form a settable composition.

In one embodiment, the present invention provides a method comprising providing a cementing composition, wherein the cementing composition comprises water; and at least three particulate materials chosen from the group consisting of: (a) cement kiln dust, vitrified shale, zeolite, or amorphous silica having a particle size in the range of from about 7 nanometers to about 50 nanometers; (b) cement kiln dust, vitrified shale, zeolite, or amorphous silica having a particle size in the range of from about 0.05 microns to about 0.5 microns; (c) cement kiln dust, vitrified shale, zeolite, or amorphous silica having a particle size in the range of from about 0.5 microns to about 10 microns; (d) cement kiln dust, vitrified shale, zeolite, or amorphous silica having a particle size in the range of from about 10 microns to about 20 microns; (e) cement kiln dust, vitrified shale, zeolite, or amorphous silica having a particle size in the range of from about 20 microns to about 200 microns; (f) cement kiln dust, vitrified shale, zeolite, or amorphous silica having a particle size in the range of from about 200 microns to about 800 microns; and (g) cement kiln dust, vitrified shale, zeolite, or amorphous silica having a particle size greater than about 1 millimeter, wherein a solids volume total of the at least three particulate materials comprises a maximum packing volume fraction; and placing the cementing composition in a subterranean formation.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to cementing operations and, more particularly, to cementing compositions comprising water, CKD, vitrified shale, zeolite, and/or amorphous silica, that are prepared by utilizing a packing volume fraction, and associated methods of use. The cementing compositions of the present invention may be used in a variety of subterranean applications, including primary cementing, remedial cementing, and drilling operations. The cementing compositions of the present invention also may be used in surface applications, for example, construction cementing.

In some embodiments, cementing compositions of the present invention comprise water, CKD, vitrified shale, zeolite, and/or amorphous silica, that utilize a packing volume fraction. Optional additives also may be included in the cementing compositions of the present invention as desired, including, but not limited to, hydraulic cement, other materials such as silica, hematite or other iron oxide, barium hydroxide, carbonates, alumina etc., and organic products such as plastic wastes and other compatible wastes. The cementing composition may further include set retarding additives, set accelerating additives, dispersing agents, fluid loss control additives, lightweight additives, and the like.

The cementing compositions of the present invention should utilize a packing volume fraction suitable for a particular application as desired. As used herein, the term "packing volume fraction" refers to the volume of the solid particulate materials in a fluid divided by the total volume of the fluid. The size ranges of the preferred solid particulate materials are selected, as well as their respective proportions, in order to provide a maximum (or close as possible to maximum) packing volume fraction so that the fluid is in a hindered settling state. It is known that, in such a state, the solid particulate materials behave "collectively" like a porous solid material. The hindered settling state is believed to correspond, in practice, to a much higher solid material concentration in the fluid than that present in the prior art.

The present invention consists of the combination of at least three features to obtain a maximum packing volume fraction. One is the use of at least three particulate materials wherein the at least three particulate materials are in size ranges "disjointed" from one another. Another feature of the present invention is the choice of the proportions of the three particulate materials in relation to the mixing, such that the fluid, when mixed, is in a hindered settling state. Another feature is the choice of the proportions of the three particulate materials between each other, and according to their respective size ranges, such that the maximum packing volume fraction is at least substantially achieved for the sum total of all particulate materials in the fluid system. Packing volume fraction is described in further detail in U.S. Pat. No. 5,518,996, the entire disclosure of which is incorporated herein by reference.

The present invention employs the use of at least three particulate materials comprising CKD, vitrified shale, zeolite, and/or amorphous silica. The sizes of these materials may be "ultra fine," "very fine," "fine," "small," "medium," "large," and "very large," and "very large" particulate materials. "Ultra fine" particulate materials may be present with a size in the range of from about 7 nanometers to about 50 nanometers. "Very fine" particulate materials may be present with a size in the range of from about 0.05 microns to about 0.5 microns. "Fine" particulate materials may be present with a size in the range of from about 0.5 microns to about 10 microns. "Small" particulate materials may be present with a size in the range of from about 10 microns to about 20 microns. "Medium" particulate materials may be present with a size in the range of from about 20 microns to about 200 microns. "Large" particulate materials may be present with a size in the range of from about 200 microns to about 800 microns. "Very large" particulate materials may be present with a size greater than about 1 millimeters. As recognized by one skilled in the art, the proportion of particulates chosen in the composition depend on the end use. In any event, the particulates and the relative sizes and concentrations in a given composition should be chosen based on a maximum packing volume fraction as disclosed herein.

In certain embodiments, the cementing compositions of the present invention may comprise CKD, a waste material generated during the manufacture of cement. CKD, as that term is used herein, refers to a partially calcined kiln feed that is removed from the gas stream and collected in a dust collector during the manufacture of cement. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$. In some embodiments, the CKD may be present as fine particulate materials. In other embodiments, the CKD may be present as small particulate materials. In other embodiments, the CKD may be present as medium particulate materials. In other embodiments, the CKD may be present as large particulate materials. In certain embodiments, the CKD may be present in the cementing compositions of the present invention in an amount in the range of from about 25% to about 75% by weight of composition ("bwoc") therein.

In certain embodiments, the cementing compositions of the present invention may comprise vitrified shale in an amount sufficient to provide the desired compressive strength, density, and/or cost. A variety of shales are suitable, including those comprising silicon, aluminum, calcium, and/or magnesium. Suitable examples of vitrified shale include, but are not limited to, "PRESSUR-SEAL® FINE LCM" material and "PRESSUR-SEAL® COARSE LCM" material, which are commercially available from TXI Energy Services, Inc., Houston, Tex. In certain embodiments, the vitrified shale may be present as large particulate materials. In other embodiments, the vitrified shale may be present as very large particulate materials. In certain embodiments, the vitrified shale may be present in the cementing compositions of the present invention in an amount in the range of from about 10% to about 30% bwoc therein. One of ordinary skill in the art, with the benefit of this disclosure, will recognize the appropriate amount of the shale to include for a chosen application.

In certain embodiments, the cementing compositions of the present invention may comprise zeolite. Zeolite may be used in conjunction with vitrified shale in some embodiments. In other embodiments, zeolite may be an alternative to vitrified shale. The choice may be dictated by a number of factors, such as total extent of compressive strength of the cement, time for cement composition to develop compressive strength, and density of the composition. Zeolites generally are porous alumino-silicate minerals that may be either a natural or synthetic material. Synthetic zeolites are based on the same type of structural cell as natural zeolites, and may comprise aluminosilicate hydrates. As used herein, the term "zeolite" refers to all natural and synthetic forms of zeolite. In certain embodiments, the zeolite may be present as fine particulate materials. In other embodiments, the zeolite may be present as small particulate materials. In other embodiments, the zeolite may be present as medium particulate materials. In other embodiments, the zeolite may be present as large particulate materials. In certain embodiments, the zeolite may be present in the cementing compositions of the present invention in an amount in the range of from about 10% to about 25% bwoc therein.

In certain embodiments, suitable zeolites for use in present invention may include "analcime" (which is hydrated sodium aluminum silicate), "bikitaite" (which is lithium aluminum silicate), "brewsterite" (which is hydrated strontium barium calcium aluminum silicate), "chabazite" (which is hydrated calcium aluminum silicate), "clinoptilolite" (which is hydrated sodium aluminum silicate), "faujasite" (which is hydrated sodium potassium calcium magnesium aluminum silicate), "harmotome" (which is hydrated barium aluminum silicate), "heulandite" (which is hydrated sodium calcium aluminum silicate), "laumontite" (which is hydrated calcium aluminum silicate), "mesolite" (which is hydrated sodium calcium aluminum silicate), "natrolite" (which is hydrated sodium aluminum silicate), "paulingite" (which is hydrated potassium sodium calcium barium aluminum silicate), "phillipsite" (which is hydrated potassium sodium calcium aluminum silicate), "scolecite" (which is hydrated calcium aluminum silicate), "stellerite" (which is hydrated calcium aluminum silicate), "stilbite" (which is hydrated sodium calcium aluminum silicate), and "thomsonite" (which is hydrated sodium calcium aluminum silicate), and combinations thereof. In certain embodiments, suitable zeolites for use in the present invention include chabazite and clinoptilolite. An example of a suitable source of zeolite is available from the C2C Zeolite Corporation of Calgary, Canada.

In certain embodiments, the cementing compositions of the present invention may comprise amorphous silica. Amorphous silica is generally a byproduct of a ferrosilicon production process, wherein the amorphous silica may be formed by oxidation and condensation of gaseous silicon suboxide, SiO, which is formed as an intermediate during the process. An example of a suitable source of amorphous silica is commercially available from Halliburton Energy Services, Inc., Duncan, Okla., under the trade name "SILICALITE." In certain embodiments, the amorphous silica may be present as very fine particulate materials. In other embodiments, the amorphous silica may be present as fine particulate materials. In other embodiments, the amorphous silica may be present as small particulate materials. In other embodiments, the amorphous silica may be present as medium particulate materials. In certain embodiments, the amorphous silica may be present in the cementing compositions of the present invention in an amount in the range of from about 5% to about 40% bwoc therein.

The water used in the cementing compositions of the present invention may include freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that may adversely affect other components in the cementing composition. In some embodiments, the water may be included in an amount sufficient to form a pumpable slurry. In some embodiments, the water may be included in the cementing compositions of the present invention in an amount in the range of from about 40% to about 200% by weight. As used herein, the term "by weight," when used herein to refer to the percent of a component in the cementing composition, means by weight included in the cementing compositions of the present invention relative to the weight of the dry components in the cementing composition. In some embodiments, the water may be included in an amount in the range of from about 40% to about 150% by weight.

The cementing compositions of the present invention may optionally comprise a hydraulic cement. A variety of hydraulic cements may be utilized in accordance with the present invention, including, but not limited to, those comprising calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain embodiments, the hydraulic cement may comprise a Portland cement. In some embodiments, the Portland cements that are suited for use in the present invention are classified as Classes A, C, H, and G cements according to American Petroleum Institute, *API Specification for Materials and Testing for Well Cements*, API Specification 10, Fifth Ed., Jul. 1, 1990. In certain embodiments, the cement may be present in the cementing compositions of the present invention in an amount in the range of from about 20% to about 50% bwoc therein.

In certain embodiments, the cementing compositions of the present invention further may comprise a set retarding additive. As used herein, the term "set retarding additive" refers to an additive that retards the setting of the cementing compositions of the present invention. Examples of suitable set retarding additives include, but are not limited to, ammonium, alkali metals, alkaline earth metals, metal salts of sulfoalkylated lignins, hydroxycarboxy acids, copolymers that comprise acrylic acid or maleic acid, and combinations thereof. One example of a suitable sulfoalkylate lignin comprises a sulfomethylated lignin. Suitable set retarding additives are disclosed in more detail in U.S. Pat. No. Re. 31,190, the entire disclosure of which is incorporated herein by reference. Suitable set retarding additives are commercially available from Halliburton Energy Services, Inc. in Duncan, Okla., under the tradenames "HR® 4," "HR® 5," HR® 7," "HR® 12," "HR® 15," HR® 25," "SCR™ 100," and "SCR™ 500." Generally, where used, the set retarding additive may be included in the cementing compositions of the present invention in an amount sufficient to provide the desired set retardation. In some embodiments, the set retarding additive may be present in an amount in the range of from about 0.1% to about 5% by weight.

Optionally, other additional additives may be added to the cementing compositions of the present invention as deemed appropriate by one skilled in the art, with the benefit of this disclosure. Examples of such additives include, but are not limited to, accelerators, weight reducing additives, heavyweight additives, lost circulation materials, filtration control additives, dispersants, and combinations thereof. Suitable examples of these additives include crystalline silica compounds, amorphous silica, salts, fibers, hydratable clays, microspheres, pozzolan lime, latex cement, thixotropic additives, combinations thereof and the like.

An example of a cementing composition of the present invention may comprise water, cement, CKD, amorphous silica, and vitrified shale. Another example of a cementing composition of the present invention may comprise water, cement, CKD, amorphous silica, zeolite, and vitrified shale. As desired by one of ordinary skill in the art, with the benefit of this disclosure, such cementing composition of the present invention further may comprise any of the above-listed additives, as well any of a variety of other additives suitable for use in subterranean applications.

The cementing compositions of the present invention may be used in a variety of subterranean applications, including, but not limited to, primary, cementing, remedial cementing, and drilling operations. The cementing compositions of the present invention also may be used in surface applications, for example, construction cementing.

An example of a method of the present invention comprises providing a cementing composition of the present invention comprising water and particulate materials in a hindered settling state; placing the cementing composition in a location to be cemented; and allowing the cementing composition to set therein. In some embodiments, the location to be cemented may be above ground, for example, in construction cementing. In some embodiments, the location to be cemented may be in a subterranean formation, for example, in subterranean applications. As desired by one of ordinary skill in the art, with the benefit of this disclosure, the cementing compositions of the present invention useful in this method further may comprise any of the above-listed additives, as well any of a variety of other additives suitable for use in subterranean applications.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A method of cementing, comprising:
   maximizing a packing volume fraction in a cementing composition using at least one particulate material with a particle size in the range of from about 7 nanometers to about 1 millimeter, the at least one particulate material selected from the group consisting of cement kiln dust, vitrified shale, zeolite, and combinations thereof;
   introducing the cementing composition into a subterranean formation; and
   allowing the cementing composition to set in the subterranean formation.

2. The method of claim 1 wherein the cementing composition comprises a hydraulic cement.

3. The method of claim 1 wherein the cementing composition comprises Portland cement.

4. The method of claim 1 wherein the at least one particulate material comprises the cement kiln dust.

5. The method of claim 1 wherein the at least one particulate material comprises the vitrified shale.

6. The method of claim 1 wherein the at least one particulate material comprises the zeolite.

7. The method of claim 1 wherein the cementing composition comprises at least three different particle sizes selected from the group consisting of a particle size in the range of from about 7 nanometers to about 50 nanometers, a particle size in the range of from about 0.05 microns to about 0.5 microns, a particle size in the range of from about 0.5 microns to about 10 microns, a particle size in the range of from about 10 microns to about 20 microns, a particle size in the range of from about 20 microns to about 200 microns, a particle size in the range of from about 200 microns to about 800 microns, and a particle size greater than about 1 millimeter.

8. A method of cementing, comprising:
   introducing a cementing composition into a subterranean formation, wherein the cementing composition comprises water, hydraulic cement, and at least one particulate material with a particle size in the range of from about 7 nanometers to about 1 millimeter, the at least one particulate material selected from the group consisting of cement kiln dust, vitrified shale, zeolite, and combinations thereof;
   wherein a solids volume total in the cementing compositions comprises a maximum packing volume fraction; and
   allowing the cementing composition to set in the subterranean formation.

9. The method of claim 8 wherein the hydraulic cement comprises Portland cement.

10. The method of claim 8 wherein the at least one particulate material comprises the cement kiln dust.

11. The method of claim 8 wherein the at least one particulate material comprises the vitrified shale.

12. The method of claim 8 wherein the at least one particulate material comprises the zeolite.

13. The method of claim 8 wherein the solids volume present in the cement composition comprises at least three different particle sizes selected from the group consisting of a particle size in the range of from about 7 nanometers to about 50 nanometers, a particle size in the range of from about 0.05 microns to about 0.5 microns, a particle size in the range of from about 0.5 microns to about 10 microns, a particle size in the range of from about 10 microns to about 20 microns, a particle size in the range of from about 20 microns to about 200 microns, a particle size in the range of from about 200 microns to about 800 microns, and a particle size greater than about 1 millimeter.

14. A method of cementing comprising:
   providing an unhydrated mixture of at least three particulate materials chosen from the group consisting of:
   (a) cement kiln dust, vitrified shale, zeolite, or amorphous silica having a particle size in the range of from about 7 nanometers to about 50 nanometers;
   (b) cement kiln dust, vitrified shale, zeolite, or amorphous silica having a particle size in the range of from about 0.05 microns to about 0.5 microns;
   (c) cement kiln dust, vitrified shale, zeolite, or amorphous silica having a particle size in the range of from about 0.5 microns to about 10 microns;
   (d) cement kiln dust, vitrified shale, zeolite, or amorphous silica having a particle size in the range of from about 10 microns to about 20 microns;
   (e) cement kiln dust, vitrified shale, zeolite, or amorphous silica having a particle size in the range of from about 20 microns to about 200 microns;
   (f) cement kiln dust, vitrified shale, zeolite, or amorphous silica having a particle size in the range of from about 200 microns to about 800 microns; and
   (g) cement kiln dust, vitrified shale, zeolite, or amorphous silica having a particle size greater than about 1 millimeter, wherein a solids volume total of the at least three particulate materials comprises a maximum packing volume fraction adding water to the unhydrated mixture to form a settable composition; and placing the settable composition in a subterranean formation.

15. The method of claim 14 wherein the settable composition comprises a hydraulic cement.

16. The method of claim 14 wherein the unhydrated mixture comprises at least one material selected from the group consisting of silica, hematite, iron oxide, barium hydroxide, a carbonate, alumina, an organic product, and combinations thereof.

17. The method of claim 14 wherein the cement kiln dust is present in the settable composition in an amount in the range of from about 25% to about 75% by weight of the settable composition.

18. The method of claim 14 wherein the vitrified shale is present in the settable composition an amount in the range of from about 10% to about 30% by weight of the settable composition.

19. The method of claim 14 wherein the zeolite is present in the settable composition in an amount in the range of from about 10% to about 25% by weight of the settable composition.

20. The method of claim 14 wherein the amorphous silica is present in the settable composition in an amount in the range of from about 5% to about 40% by weight of the settable composition.

21. A method comprising:

providing a cementing composition, wherein the cementing composition comprises water; and at least three particulate materials chosen from the group consisting of:
  (a) cement kiln dust, vitrified shale, zeolite, or amorphous silica having a particle size in the range of from about 7 nanometers to about 50 nanometers;
  (b) cement kiln dust, vitrified shale, zeolite, or amorphous silica having a particle size in the range of from about 0.05 microns to about 0.5 microns;
  (c) cement kiln dust, vitrified shale, zeolite, or amorphous silica having a particle size in the range of from about 0.5 microns to about 10 microns;
  (d) cement kiln dust, vitrified shale, zeolite, or amorphous silica having a particle size in the range of from about 10 microns to about 20 microns;
  (e) cement kiln dust, vitrified shale, zeolite, or amorphous silica having a particle size in the range of from about 20 microns to about 200 microns;
  (f) cement kiln dust, vitrified shale, zeolite, or amorphous silica having a particle size in the range of from about 200 microns to about 800 microns; and
  (g) cement kiln dust, vitrified shale, zeolite, or amorphous silica having a particle size greater than about 1 millimeter, wherein a solids volume total of the at least three particulate materials comprises a maximum packing volume fraction; and placing the cementing composition in a subterranean formation.

22. The method of claim 21 further comprising the step of allowing the cementing composition to set therein.

23. The method of claim 21 wherein the water is selected from the group consisting of freshwater, saltwater, a brine, seawater, and combinations thereof.

24. The method of claim 21 wherein the cementing composition comprises a hydraulic cement.

25. The method of claim 21 wherein the cementing composition comprises at least one material selected from the group consisting of silica, hematite, iron oxide, barium hydroxide, a carbonate, alumina, an organic product, and combinations thereof.

26. The method of claim 21 wherein the cementing composition comprises at least one additive selected from the group consisting of a set retarding additive, an accelerator, a lost circulation material, a filtration control additive, a dispersant, and combinations thereof.

27. The method of claim 21 wherein the cement kiln dust is present in the cementing composition in an amount in the range of from about 25% to about 75% by weight of the cementing composition.

28. The method of claim 21 wherein the vitrified shale is present in the cementing composition an amount in the range of from about 10% to about 30% by weight of the cementing composition.

29. The method of claim 21 wherein the zeolite is present in the cementing composition in an amount in the range of from about 10% to about 25% by weight of the cementing composition.

30. The method of claim 21 wherein the amorphous silica is present in the cementing composition in an amount in the range of from about 5% to about 40% by weight of the cementing composition.

31. A method of cementing, comprising:

introducing a cementing composition into an annular space between a subterranean formation and a pipe string disposed in the subterranean formation, wherein the cementing composition comprises water, and at least three particulate materials chosen from the group consisting of:
  (a) cement kiln dust, vitrified shale, zeolite, or amorphous silica having a particle size in the range of from about 7 nanometers to about 50 nanometers;
  (b) cement kiln dust, vitrified shale, zeolite, or amorphous silica having a particle size in the range of from about 0.05 microns to about 0.5 microns;
  (c) cement kiln dust, vitrified shale, zeolite, or amorphous silica having a particle size in the range of from about 0.5 microns to about 10 microns;
  (d) cement kiln dust, vitrified shale, zeolite, or amorphous silica having a particle size in the range of from about 10 microns to about 20 microns;
  (e) cement kiln dust, vitrified shale, zeolite, or amorphous silica having a particle size in the range of from about 20 microns to about 200 microns;
  (f) cement kiln dust, vitrified shale, zeolite, or amorphous silica having a particle size in the range of from about 200 microns to about 800 microns; and
  (g) cement kiln dust, vitrified shale, zeolite, or amorphous silica having a particle size greater than about 1 millimeter, wherein a solids volume total of the at least three particulate materials comprises a maximum packing volume fraction; and allowing the cementing composition to set in the annular space.

32. The method of claim 31 wherein the cement kiln dust is present in the cementing composition in an amount in the range of from about 25% to about 75% by weight of the cementing composition.

33. The method of claim 31 wherein the vitrified shale is present in the cementing composition an amount in the range of from about 10% to about 30% by weight of the cementing composition.

* * * * *